United States Patent
Raj et al.

(10) Patent No.: US 10,726,031 B2
(45) Date of Patent: Jul. 28, 2020

(54) COMPUTER IMPLEMENTED SYSTEM AND METHOD FOR INTEGRATING AND PRESENTING HETEROGENEOUS INFORMATION

(71) Applicant: Tata Consultancy Services Ltd., Mumbai, Maharashtra (IN)

(72) Inventors: Bhanu Raj, Chennai (IN); Sivashanmugam Kannan, Karaikal (IN); Mahadevan Devarajan, Chennai (IN); Sandhyalakshmi Subramanian, Chennai (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 507 days.

(21) Appl. No.: 14/934,431

(22) Filed: Nov. 6, 2015

(65) Prior Publication Data
US 2017/0039255 A1    Feb. 9, 2017

(30) Foreign Application Priority Data

Aug. 3, 2015    (IN) .......................... 2926/MUM/2015

(51) Int. Cl.
*G06F 17/00*    (2019.01)
*G06F 7/00*    (2006.01)
(Continued)

(52) U.S. Cl.
CPC ........ *G06F 16/248* (2019.01); *G06F 16/2365* (2019.01); *G06F 16/951* (2019.01);
(Continued)

(58) Field of Classification Search
CPC ......... G06F 17/30554; G06F 17/30371; G06F 17/30864; G06Q 10/06; G06Q 50/04; Y02P 90/30
(Continued)

(56) References Cited

U.S. PATENT DOCUMENTS 6,381,556 B1 *  4/2002  Kazemi ............ G05B 19/41875
                                                    345/594
6,859,676 B1 *  2/2005  Kazemi .............. G05B 19/4099
                                                    700/105
(Continued)

FOREIGN PATENT DOCUMENTS

WO    2007072501 A2    6/2007

OTHER PUBLICATIONS

Tata Consultancy Services "Netasthra" accessed online at least as early as Nov. 15, 2015at <http://netasthra.tcsicc.com/Netasthra/#>.

*Primary Examiner* — Pavan Mamillapalli
(74) *Attorney, Agent, or Firm* — Blueshift IP, LLC; Robert Plotkin

(57) ABSTRACT

A computer implemented system and method for integrating and presenting heterogeneous information is envisaged. The system slices and dices information and enables the information to be depicted in the form of dashboards and reports by tying data points on different sources into an integrated solution, and also enables a user to select the information that he/she wants to view, thereby enabling real-time visibility, quick decision making and planning. The system allows easy interaction between teams to access and understand complex information quickly. The system of the present disclosure can integrate data spread across multiple domains, horizontals and verticals, and display the required result in a desired format. The system also has ability to restrict dashboards and reports to certain groups of users by means of profiling based on roles in the organization.

8 Claims, 2 Drawing Sheets

Figure 1:
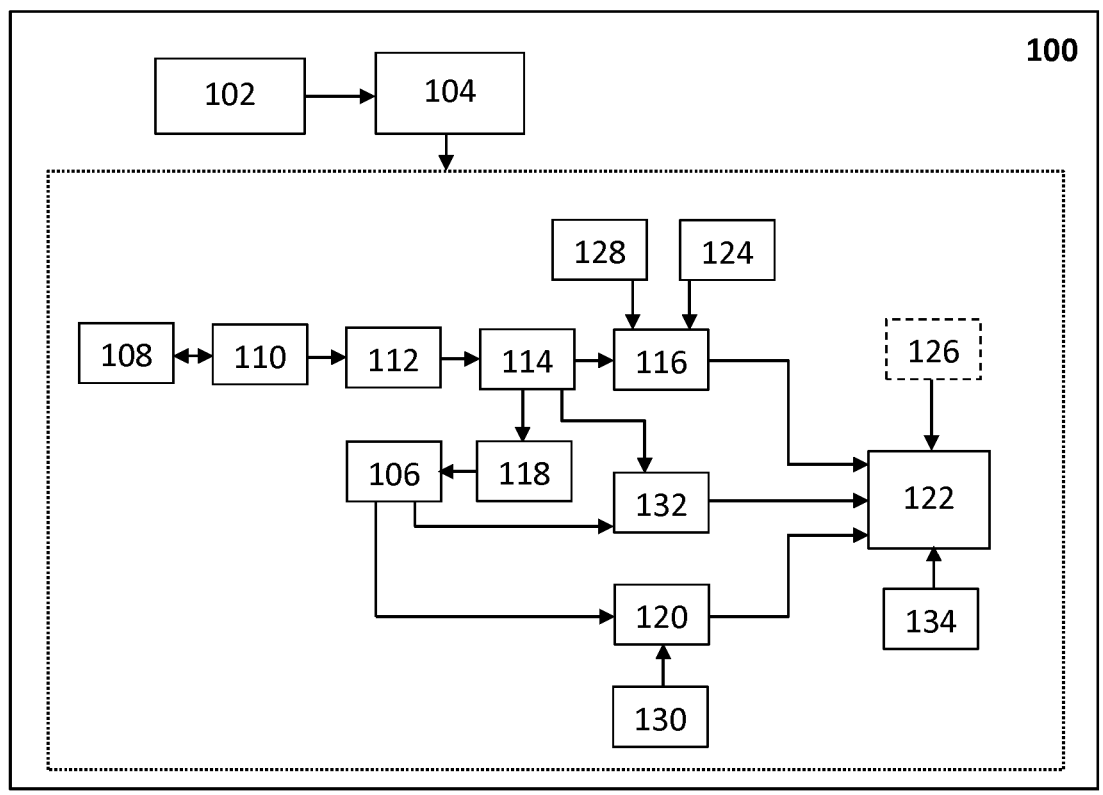

(51) Int. Cl.
*G06F 16/248* (2019.01)
*G06F 16/951* (2019.01)
*G06F 16/23* (2019.01)
*G06Q 10/06* (2012.01)
*G06Q 50/04* (2012.01)

(52) U.S. Cl.
CPC ............ *G06Q 10/06* (2013.01); *G06Q 50/04* (2013.01); *Y02P 90/30* (2015.11)

(58) Field of Classification Search
USPC ........................................................ 707/694
See application file for complete search history.

(56) References Cited

U.S. PATENT DOCUMENTS

| | | |
|---|---|---|
| 7,065,566 B2 | 6/2006 | Menard |
| 8,713,160 B1 | 4/2014 | Ou |
| 8,725,853 B2 | 5/2014 | Sellers |
| 8,775,232 B2 | 7/2014 | Chetwood |
| 2002/0169872 A1* | 11/2002 | Nomiyama ............ H04L 29/06 709/224 |
| 2004/0186903 A1 | 9/2004 | Lambertz |
| 2005/0273311 A1 | 12/2005 | Lautt |
| 2006/0004731 A1* | 1/2006 | Seibel ................ G06Q 30/0239 707/999.003 |
| 2009/0182594 A1* | 7/2009 | Choubey ................ G06Q 10/06 705/7.33 |
| 2010/0179953 A1* | 7/2010 | Kan ...................... G06F 16/951 707/741 |
| 2012/0226626 A1* | 9/2012 | Venkateswaran ...... G06Q 10/06 705/342 |
| 2015/0058092 A1* | 2/2015 | Rea ..................... G06Q 10/0639 705/7.38 |

\* cited by examiner

COMPUTER IMPLEMENTED SYSTEM AND METHOD FOR INTEGRATING AND PRESENTING HETEROGENEOUS INFORMATION

TECHNICAL FIELD

The present disclosure relates to the field of combining and presenting variety of information.

BACKGROUND

Large scale organizations, factories or manufacturing companies require huge amount of information from numerous sources for efficient and effective production and monitoring. This information may be gauged to identify problems to ensure the smooth functioning of their environment. To collect, access, and convert this voluminous disparate data into useful information typically takes much effort and time. Moreover, it is difficult to study all the information and combine it to create reports. Accuracy and user-friendliness of such reports becomes debatable. Additionally, the person(s) collecting the information needs to check with multiple machines, apparatus, workstations or tools to get the information. Extraction of such information also becomes tedious, depending on the volume. It is also difficult to search and obtain historical information related to the current data. Furthermore, it takes considerable time to present the created reports based on historical as well as current information to a supervisor. Since the data received by a user is huge and disparate, it is difficult for the user to sift through this information/data and zero-in on data that is immediately required for taking corrective action or otherwise.

To limit the aforementioned drawbacks, there is a need for a system that integrates and presents heterogeneous information effectively.

SUMMARY

The present disclosure relates to a computer implemented system for integrating and presenting heterogeneous information. In an embodiment, the system comprises a first repository to store a set of rules and a processor to receive these set of rules to generate a set of commands based on the rules. The system also comprises an intransient repository that stores historical data being defined as data prior to a pre-determined time. It further includes a crawler and extractor that cooperates with the processor to periodically crawl through a plurality of pre-determined information sources to selectively extract time-sensitive information corresponding to a continuously forward moving set time interval based on commands from the processor. A converter validator present in the system then processes and validates the extracted time-sensitive information corresponding to a specific time interval to obtain validated data based on commands from the processor. The system includes a transient repository to receive this validated data corresponding to a specific interval, and also includes a dashboard creator to populate one or many dashboards with the received validated data. A flush is included in the system to selectively clear the transient repository periodically after the expiry of the pre-selected time interval and transfer the cleared data to the intransient repository. Based on the stored data in the intransient repository, a report creator present in the system processes the stored historical data to generate pre-determined reports. A display present in the system then cooperates with the dashboard and the report creator to display user-determined dashboards and the generated reports.

This summary is provided to introduce concepts related to integrating and presenting heterogeneous information, which is further described below in the detailed description. This summary is neither intended to identify all the essential features of the present disclosure nor is it intended for use in determining or limiting the scope of the present disclosure.

BRIEF DESCRIPTION OF ACCOMPANYING DRAWINGS

Figure 2:
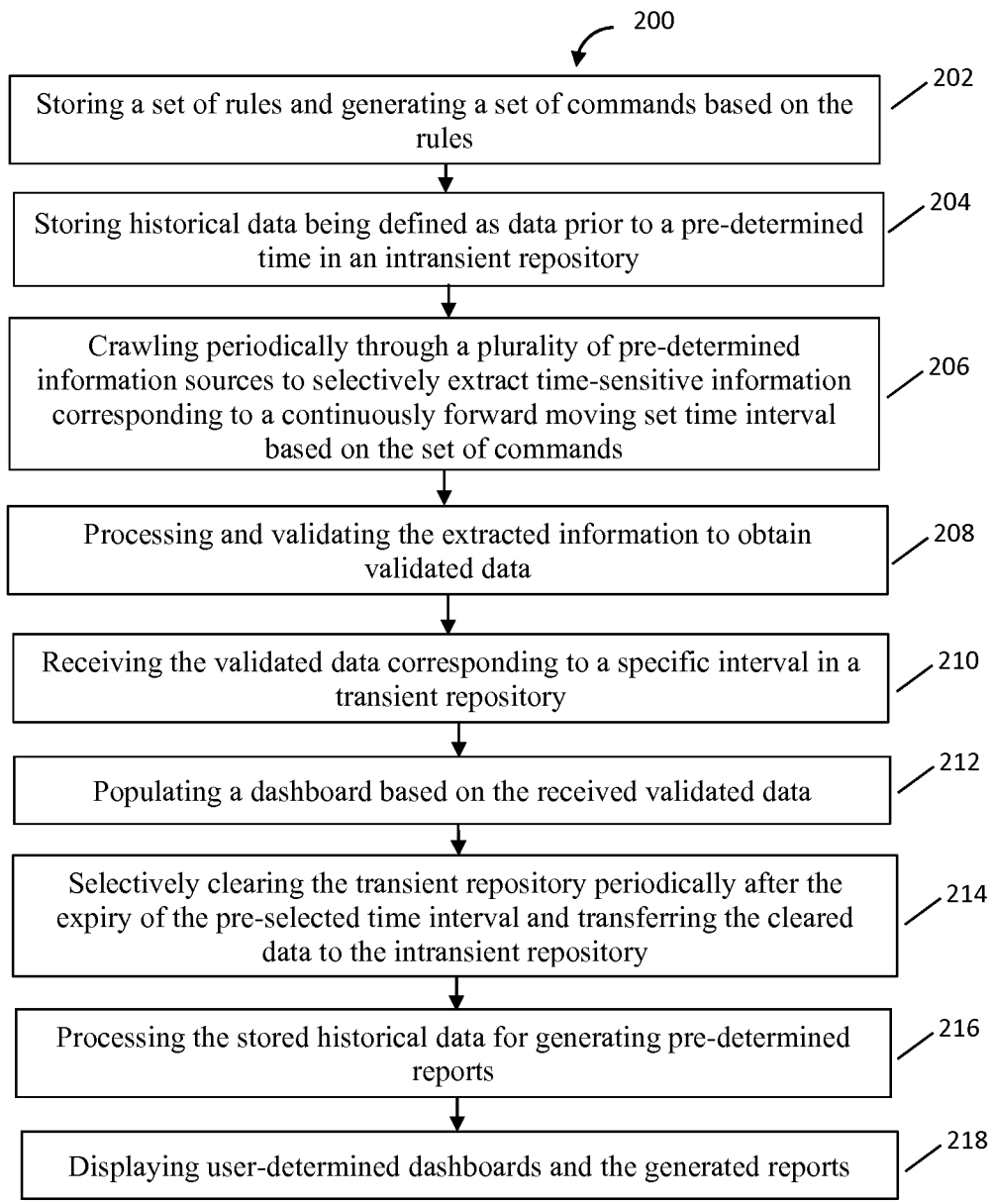

A computer implemented system and method of the present disclosure for integrating and presenting heterogeneous information, will now be described with the help of accompanying drawings, in which:

FIG. 1 illustrates a schematic of an embodiment of the system for integrating and presenting heterogeneous information; and FIG. 2 illustrates a method for integrating and presenting heterogeneous information.

DETAILED DESCRIPTION

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It is important for an enterprise to gain information on the infrastructure health which may be scattered across geographically. Large scale organizations, factories or manufacturing companies require huge amount of information from numerous sources for efficient and effective production and monitoring. This information may be gauged to identify problems to ensure the smooth functioning of their environment. To collect, access, and convert this voluminous disparate data into useful information typically takes much effort and time. Moreover, it is difficult to study all the information and combine it to create reports. Accuracy and user-friendliness of such reports becomes debatable. Additionally, the person(s) collecting the information needs to check with multiple machines, apparatus, workstations or tools to get the information. Extraction of such information also becomes tedious, depending on the volume. It is also difficult to search and obtain historical information related to the current data. Furthermore, it takes considerable time to present the created reports based on historical as well as current information to a supervisor. Since the data received by a user is huge and disparate, it is difficult for the user to sift through this information/data and zero-in on data that is immediately required for taking corrective action or otherwise.

In the manual method of data sourcing, collection and integration of the prior art, it is difficult to understand and identify risk factors which may result in severe impact on business and huge losses. In any event, a user needs to check each source with a tool to obtain data. These tools may not be compatible and multiple tools may have to be used. Extraction of data therefore is tedious. The existing systems are also not able to prepare trend comparison data between time intervals such as days, weeks or months. It may also happen that in the absence of periodic and real time updates, he/she will be isolated from the environment resulting in losses for the business.

The present disclosure provides a computer implemented system which can slice and dice information and enables the information to be depicted in the form of dashboards and reports by tying data points on different sources into an integrated solution, but at the same time enable a user to select the information that he/she wants to see, thereby enabling real-time visibility, quick decision making and planning and also allow easy interaction between teams to access and understand complex information quickly. The system of the present disclosure can on one hand integrate data spread across multiple domains, horizontals and verticals, and display the required result in a desired format such as graphical, tabular, excel, pdf, ppt, and at the same time it has the ability to restrict dashboards and reports to certain groups of users by means of profiling based on roles in the organization.

The disclosure will now be described with reference to the accompanying non-limiting drawings which illustrate one embodiment of the computer implemented system for integrating and presenting heterogeneous information.

Referring to the accompanying drawings, FIG. 1 illustrates a schematic of an embodiment of the system 100 for integrating and presenting heterogeneous information. The system comprises a first repository 102 to store a set of rules and a processor 104 to receive these set of rules to generate a set of commands based on the rules. These rules may be initially added into the first repository 102 during a training phase of the system 100 and may be updated continuously during it's use particularly when the system 100 encounters an anomalous situation. The processor 104 provides these commands to the modules present in the system 100 to control the functioning of the modules. The system also comprises an intransient repository 106, a crawler and extractor 110, a converter validator 112, a transient repository 114, a dashboard creator 116, a flush 118, a report creator 120 and a display 122. The intransient repository 106 stores all the historical data. In one embodiment, the structure of the intransient repository 106 includes a receiver and a hardware register. The receiver receives commands from the processor 104 to store information in the hardware register. The information is permanently stored in the hardware register unless it is not explicitly erased. Register files, standard SRAM, individual flip-flops and high-speed core memory are the types of registers that may form the intransient repository 106. The historical data stored in the intransient repository 106 is the data prior to a pre-determined time. In an embodiment, the predetermined time can be set by a user or it can be pre-set by the system. The crawler and extractor 110 receives commands from the processor 104 to periodically crawl through a plurality of pre-determined information sources 108 to selectively extract time-sensitive information corresponding to a continuously forward moving set time interval. In one embodiment, the structure of the crawler and extractor 110 includes a receiver, a scheduler, a parser, a crawl manager and an extractor. The receiver receives rules and commands from the processor 104 regarding the information to be extracted from the pre-determined sources based on which the scheduler creates a list/queue to identify which information needs to be extracted first. The parser then parses/splits the information from the pre-determined sources into pieces to allow better searching of the required information. The crawl manager then guides the crawler and extractor 110 to crawl through the parsed information and the extractor extracts the relevant information based on the received commands.

Considering an example of a manufacturing unit, the crawler and extractor 110 periodically crawls through data generated by various machines, apparatus and workstations to extract relevant information related to the working conditions and progress at various stages of obtaining desired products. In one embodiment, a user can fix the time period for the crawler and extractor 110 to crawl and extract the information. The extracted information may not be in a format suitable for the system 100. The information may not be relevant or as required. So, to convert this information in a suitable form, the converter validator 112 present in the system 100 processes and validates the extracted time-sensitive information corresponding to a specific time interval as received from the crawler and extractor 110 and obtains validated data. In one embodiment, the converter validator 112 comprises a receiver to receive commands from the processor 104 to convert and validate information. It also includes an identifier to identify formats of the extracted information and then various conversion tools present in the converter validator 112 convert the information into a suitable format. If format of the extracted information is unidentifiable or if an appropriate conversion tool is not available, the converter validator 112 searches for the appropriate tool or sends a request to the system 100 to request a conversion tool from a user. Once the information is converted in a suitable format, a validator included in the converter validator 112 validates the information by checking that the information adheres to the rules provided by the processor 104. The transient repository 114 receives this validated data corresponding to a specific interval which is then used by the dashboard creator 116 to populate one or more dashboards. In one embodiment, the structure of the transient repository 114 includes a receiver and a pipeline register. The receiver receives commands from the processor 104 to temporarily store information in the pipeline register. The pipeline register is configured to cooperate with an external clock based on which the information stored in the pipeline is erased and current information is stored. Buffers can also be used as pipeline registers to temporarily store information. In an embodiment, the structure of the dashboard creator 116 includes a receiver, a data comparator and a format modifier. The receiver receives rules and commands from the processor 104 to populate dashboards based on the received validated data based on which the validated data is compared and processed by the data comparator. The format modifier then modifies the format of this data to a user-defined format (like graphical, tabular, charts etc.) for presentation on the display 122. A first driller 128 is included in the system 100 to be operated by a user to drill the dashboards and populate them with time series drills or data series drills or both with an in-built recursive feature to provide multiple insights at every level. In an embodiment, the structure of the first driller 128 includes a receiver a sorter analyzer, and a transformer. The receiver receives rules and commands from the processor 104 to drill the dashboards. Based on these commands, the sorter analyzer sorts through the data from the dashboards and analyzes suitable sorted data. The transformer then transforms this analyzed sorted data in required time series drill or data series drill or both. Different time series drills may be present for different data source sets. For example, in a factory, there may be hundreds of workstations out of which ten may be absolutely critical. For these ten workstations the system 100 can be set to refresh the dashboard for every five minutes. Other workstations may be less critical, in such case, the timing for refreshing the dashboard having data from these workstations, can be set to fifteen minutes or half hour etc., and for less relevant or not so critical cases, this timing can be further increased. This ensures that an update of critical information is provided to the user on the dashboard continuously. In one embodiment, the time after which the dashboard needs to be refreshed, can be set by a user. The user can also select plurality of dashboards to be displayed. The dashboard is populated with validated data only in respect of a current time interval. A refresher 124 is present in the system 100 to continuously erase data corresponding to the previous time interval and refresh the populated content within the dashboard with validated data corresponding to a current time interval.

The flush 118 is present in the system 100 to selectively clear the transient repository 114 periodically after the expiry of the pre-selected time interval and then transfer the cleared data to the intransient repository 106. In one embodiment, the structure of the flush 118 includes a receiver, a data remover and a transmitter. The receiver receives commands from the processor 104 to flush/remove data from the transient repository after a pre-determined time duration based on which the data remover removes the data and the transmitter transmits this data to the intransient repository 106. The flush 118 can also cooperate with an external clock based which sends a notification to the flush 118 to remove the data from the transient repository 114. The data stored in the intransient repository 106 is considered to be historical data. Based on the data stored in the intransient repository 106, the report creator 120 present in the system 100 processes the stored historical data and generates pre-determined reports. In an embodiment, the structure of the report creator 120 includes a receiver, a comparator and processor, and a report manipulator 126. The receiver receives rules and commands from the processor 104 to create reports based on the received historical data based on which the historical data is compared and processed by the comparator and processor to analyzed the data. The report manipulator 126 then creates and/or manipulates reports based on the analyzed data for presentation on the display 122. In order to manipulate reports, the report manipulator 126 provides to the users, various threshold values and other report configuration options such as options to dynamically create reports. These values and threshold options are displayed on the display 122 so that a suitable option for report manipulation can be selected/chosen on the fly by a user. The display 122 then displays the manipulated reports. A second driller 130 present in the system 100 is operated by a user to manipulate the report creator 120 to generate a time series drill or a data series drill or both with an in-built recursive feature to provide multiple insights at every level. In an embodiment, the structure of the second driller 130 includes a receiver a sorter analyzer, and a transformer. The receiver receives rules and commands from the processor 104 to manipulate the reports. Based on these commands, the sorter analyzer sorts through the data from the reports and analyzes suitable sorted data. The transformer then transforms this analyzed sorted data in required time series drill or data series drill or both. The display 122 displays these generated reports along with user-determined populated dashboards. The system 100 also includes a real-time clock that cooperates with the processor, the crawler and extractor, the converter validator and the flush for assisting in setting the time interval and shifting the time interval continuously forward.

The system 100 also includes a role-based authenticator 134 configured to authenticate users in accordance with their roles and provide role-based access to the dashboards and reports. A first comparator 132 is present in the system 100 to compare the data from the transient repository 114 which is populated in a dashboard corresponding to a current time interval with data stored in the intransient repository 106 corresponding to a previous time interval and generate comparative analytics. The comparative analysis is then displayed on the display 122. A second comparator (not shown in the figure) is also included in the system 100 to compare information in one time series on a dashboard with a pre-determined number of previous time series and provide an alert to a user in an event of a significant change. For example, if a dashboard displays various values for temperatures of pipelines carrying fluids and there is a sudden change in the temperature, it may be an indication of fluid leakage which is highlighted because of this comparison. A supervisor's attention is then drawn to this indication to the problem area and appropriate corrective measures can then be taken to avoid severe damage.

In one embodiment, the system can be used in an industrial environment where an assembly line manufacturing unit has a plurality of machines and workstations for carrying out a plurality of operations. In order to manufacture finished products, for example an automobile, some of the operations on the plurality of workstations may be linked and some may be independent or standalone. Each of the machine, apparatus or workstation generates data which is independently or collectively crucial for, efficiently, economically and timeously manufacturing a product according to a specification. Ordinarily, a user obtains data from each of the machines, apparatus or workstations. The data from each of the machine, apparatus or workstation is read and controlled independently. However, when an error or defect occurs at a machine, apparatus or workstation, the information is not communicated on time to a supervisor who is inundated with voluminous data from all workstations simultaneously. Therefore, there can be serious deficiency in workmanship in the product and also a strain on the efficiency and time constraint, which can ultimately affect the economical operation in the manufacturing unit.

Using the present system, a user receives data from each source in form of a dashboard which contains current data and which is continuously being refreshed either seamlessly or in a stepped manner. Based on this dashboard, the user can instantaneously take decisions and corrective actions. Since the information layer is thin, only within time slice, in case of dashboards, the transmission of data to the user is without time loss and is not error prone. The user is then able to process that information. If there is no discrepancy in data (previous data), it is immediately flushed to an intransient repository and the dashboard is refreshed with current data. From the historical data in the intransient repository, the user or superior officer can generate reports of longer time duration.

FIG. 2 of the accompanying drawings illustrates a method 200 for integrating and presenting heterogeneous information. The method 200 includes step of storing a set of rules and generating a set of commands based on the rules 202. These generated commands are then provided to different modules for integrating and presenting information. The method 200 includes storing historical data being defined as data prior to a pre-determined time in an intransient repository 204. Crawling periodically through a plurality of pre-determined information sources to selectively extract time-sensitive information corresponding to a continuously forward moving set time interval based on the set of commands 206 is also included in the method 200. On extracting the information, the method 200 for integrating this heterogeneous information includes processing and validating this information to obtain validated data 208. The validated data is then stored in a transient repository for a pre-determined time duration by receiving the validated data corresponding to a specific interval 210. The method 200 further includes steps of populating a dashboard based on the received validated data 212 and then selectively clearing the transient repository periodically after the expiry of the pre-selected time interval and transferring the cleared data to the intransient repository 214. Further, the stored historical data is processed for generating pre-determined reports 216. The method 200 then includes displaying user-determined dashboards and the generated reports 218.

The method also includes assisting in setting the time interval and shifting the time interval continuously forward, populating the dashboard with validated data only in respect of a current time interval, continuously erasing data corresponding to the previous time interval and refreshing the populated content with the validated data corresponding to the current time interval and authenticating users in accordance with their roles and providing role-based access to the dashboards and reports. It further include steps for drilling by a user, the dashboard and populating it with time series drill or data series drill or both and manipulating by a user, for generating a time series drill or a data series drill or both. The method includes comparing the data populated in a dashboard corresponding to a current time interval with data stored in the intransient repository corresponding to a previous time interval and generating comparative analytics and comparing information in one time series on the dashboard with a pre-determined number of previous time series and providing an alert to a user in an event of a significant change.

A computer implemented system and method for integrating and presenting heterogeneous information in accordance with the present disclosure described herein above has several technical advancements including but not limited to the realization of:

a system for integrating and presenting heterogeneous information;
a system that is fast, economical and uses fewer resources; and
a system allows immediate retrieval and display of data from a plurality of sources.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer implemented system for integrating and presenting heterogeneous information from an assembly line manufacturing unit to allow corrective action, said system comprising:
    a first repository configured to store a set of rules;
    a processor configured to cooperate with the first repository to receive the set of rules and generate a set of commands based on said rules;
    an intransient repository configured to store historical data being defined as data prior to a pre-determined time;
    a crawler and extractor configured to cooperate with the processor and further configured to periodically crawl through a plurality of pre-determined information sources to selectively extract time-sensitive information corresponding to a continuously forward moving set time interval based on commands from the processor, the information comprising working conditions and/or progress of various stages in the assembly line manufacturing unit;
    a converter validator configured to cooperate with the processor and the crawler and extractor to receive commands and the extracted time-sensitive information corresponding to a specific time interval to convert the extracted information, and further configured to process and validate the converted information to obtain validated data, and further configured to search for a tool to convert the extracted information or request a conversion tool from the user if the format of the extracted information is unidentifiable or the conversion tool is not available;
    a transient repository configured to cooperate with the processor and the converter validator to receive the validated data corresponding to a specific interval;
    a dashboard creator configured to cooperate with the processor and the transient repository, and further configured to receive the validated data to populate at least one dashboard, wherein said dashboard is configured to be populated with validated data only in respect of a current time interval;
    a first driller configured to be operated by a user to drill the dashboard and populate it with time series drill or data series drill or both with an in-built recursive feature to provide multiple insights at every level and further configured to populate the dashboard by performing different time series drill for different data source sets to present information pertaining to critical data source sets at first time interval and from non critical data source sets at second time interval, wherein the first time interval is less than second time interval;
    a refresher adapted to continuously erase data corresponding to the previous time interval and refresh the populated content with the validated data corresponding to the current time interval;
    a first comparator configured to compare the data populated in the dashboard corresponding to a current time interval with data stored in the intransient repository corresponding to a previous time interval and generate comparative analytics;
    a second comparator configured to compare information in one time series on the dashboard with a pre-determined number of previous time series and provide an alert to a user in an event of a significant change;
    a flush configured to cooperate with the processor and the transient repository to selectively clear the data from the transient repository periodically after the expiry of the pre-selected time interval and further configured to transfer the cleared data to the intransient repository if there is no discrepancy in data;
    a report creator adapted to cooperate with the processor and the intransient repository, and configured to process the stored historical data to generate pre-determined reports; and
    a display configured to cooperate with the dashboard and the report creator to display user-determined dashboards and the generated predetermined reports.

2. The system as claimed in claim 1, which comprises a real-time clock cooperating with the processor, the crawler and extractor, the converter validator and the flush for assisting in setting the time interval and shifting the time interval continuously forward.

3. The system as claimed in claim 1, which includes a role-based authenticator configured to authenticate users in accordance with their roles and provide role-based access to the dashboards and reports.

4. The system as claimed in claim 1, which includes a second driller configured to be operated by a user to manipulate the report creator to generate a time series drill or a data series drill or both with an in-built recursive feature to provide multiple insights at every level.

5. A computer implemented method for integrating and presenting heterogeneous information from an assembly line manufacturing unit to allow corrective action, said method comprising the following:
- storing a set of rules and generating a set of commands based on said rules;
- storing historical data being defined as data prior to a pre-determined time in an intransient repository;
- crawling periodically through a plurality of pre-determined information sources to selectively extract time-sensitive information corresponding to a continuously forward moving set time interval based on the set of commands, the information comprising working conditions and/or progress of various stages in the assembly line manufacturing unit;
- processing and converting the extracted time-sensitive information corresponding to a specific time interval to obtain validated data, wherein said converter validator configured to search for a tool to convert the extracted information or request a conversion tool from the user if the format of the extracted information is unidentifiable or the conversion tool is not available;

receiving the validated data corresponding to a specific time interval in a transient repository;
- populating at least one dashboard based on the received validated data, populating the dashboard with validated data, wherein said dashboard is configured to be populated with validated data only in respect of a current time interval;

drilling by a user, the dashboard and populate it with time series drill or data series drill or both with an in-built recursive feature to provide multiple insights at every level, wherein said first driller configured to populate the dashboard by performing different time series drill for different data source sets to present information pertaining to critical data source sets at first time interval and from non critical data source sets at second time interval, wherein the first time interval is less than second time interval;
- continuously erasing data corresponding to the previous time interval and refreshing the populated content with the validated data corresponding to the current time interval;
  - comparing the data populated in a dashboard corresponding to the current time interval with data stored in the intransient repository corresponding to a previous time interval and generating comparative analytics;
- comparing information in one time series on the dashboard with a pre-determined number of previous time series and providing an alert to a user in an event of a significant change;
- selectively clearing the data of the transient repository periodically after the expiry of the pre-selected time interval and transferring the cleared data to the intransient repository if there is no discrepancy in data;
- processing the stored historical data for generating pre-determined reports; and
- displaying user-determined dashboards and the generated predetermined reports.

6. The method as claimed in claim 5, which includes assisting in setting the time interval and shifting the time interval continuously forward.

7. The method as claimed in claim 5, which includes authenticating users in accordance with their roles and providing role-based access to the dashboards and reports.

8. The method as claimed in claim 5, which includes manipulating by a user, for generating a time series drill or a data series drill or both with an in-built recursive feature to provide multiple insights at every level.

* * * * *